(12) United States Patent
Marin et al.

(10) Patent No.: US 11,306,608 B2
(45) Date of Patent: Apr. 19, 2022

(54) SELF-STIFFENED CASING CONSISTING OF A COMPOSITE MATERIAL WITH AN ORGANIC MATRIX

(71) Applicant: SAFRAN AIRCRAFT ENGINES, Paris (FR)

(72) Inventors: Sébastien Marin, Moissy-Cramayel (FR); Quentin Damien Lombart, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 683 days.

(21) Appl. No.: 15/505,437

(22) PCT Filed: Aug. 17, 2015

(86) PCT No.: PCT/FR2015/052213
§ 371 (c)(1),
(2) Date: Feb. 21, 2017

(87) PCT Pub. No.: WO2016/027030
PCT Pub. Date: Feb. 25, 2016

(65) Prior Publication Data
US 2017/0266893 A1    Sep. 21, 2017

Related U.S. Application Data

(60) Provisional application No. 62/040,680, filed on Aug. 22, 2014.

(30) Foreign Application Priority Data

Jan. 14, 2015   (FR) ...................................... 1550278

(51) Int. Cl.
| | | |
|---|---|---|
| F01D 21/04 | (2006.01) | |
| B29C 70/22 | (2006.01) | |
| F01D 25/24 | (2006.01) | |
| B29C 70/68 | (2006.01) | |

(Continued)

(52) U.S. Cl.
CPC .......... *F01D 21/045* (2013.01); *B29C 70/222* (2013.01); *B29C 70/24* (2013.01);
(Continued)

(58) Field of Classification Search
CPC ............. F01D 21/045; F05D 2300/603; F05D 2300/615; F05D 2300/702; F05D 2240/14; Y02T 50/672; B29C 70/24; F04D 29/526
(Continued)

(56) References Cited

U.S. PATENT DOCUMENTS

| | | | |
|---|---|---|---|
| 4,600,619 A | 7/1986 | Chee et al. | |
| 5,437,538 A * | 8/1995 | Mitchell | F01D 21/045 415/200 |

(Continued)

FOREIGN PATENT DOCUMENTS

| | | |
|---|---|---|
| EP | 2 290 197 A2 | 3/2011 |
| FR | 2 975 735 A1 | 11/2012 |

(Continued)

OTHER PUBLICATIONS

International Search Report as issued in International Patent Application No. PCT/FR2015/052213, dated Dec. 7, 2015.

*Primary Examiner* — Charles G Freay
*Assistant Examiner* — Chirag Jariwala
(74) *Attorney, Agent, or Firm* — Pillsbury Winthrop Shaw Pittman LLP

(57) ABSTRACT

A gas turbine casing made of composite material from fiber reinforcement densified by a matrix. The casing includes at least one stiffener portion extending at a radius greater than the radius of upstream and downstream portions of the casing that are adjacent to the stiffener portion so as to form an annular recess in the inside surface of the casing.

11 Claims, 4 Drawing Sheets

(51) Int. Cl.
*B29C 70/24* (2006.01)
*B29L 31/00* (2006.01)

(52) U.S. Cl.
CPC .............. *B29C 70/68* (2013.01); *F01D 25/24* (2013.01); *B29L 2031/7504* (2013.01); *F05D 2240/14* (2013.01); *F05D 2250/232* (2013.01); *F05D 2260/96* (2013.01); *F05D 2300/603* (2013.01); *F05D 2300/6033* (2013.01); *F05D 2300/615* (2013.01); *F05D 2300/702* (2013.01); *Y02T 50/60* (2013.01)

(58) Field of Classification Search
USPC .................................................. 415/119, 200
See application file for complete search history.

(56) References Cited

U.S. PATENT DOCUMENTS

| | | | | |
|---|---|---|---|---|
| 5,823,739 | A * | 10/1998 | Van Duyn | F01D 21/045 415/9 |
| 6,290,455 | B1 * | 9/2001 | Hemmelgarn | F01D 21/045 415/173.4 |
| 8,322,971 | B2 | 12/2012 | Coupe et al. | |
| 2006/0208135 | A1 * | 9/2006 | Liguore | B64C 1/40 244/117 R |
| 2008/0206048 | A1 * | 8/2008 | Coupe | B29C 70/24 415/200 |
| 2013/0048414 | A1 | 2/2013 | Gaudry et al. | |
| 2014/0150262 | A1 * | 6/2014 | Le Borgne | F01D 11/122 29/889.3 |

FOREIGN PATENT DOCUMENTS

| | | | | |
|---|---|---|---|---|
| GB | 2442112 A * | 3/2008 | .......... | F01D 21/045 |
| WO | WO 99/61757 A1 | 12/1999 | | |
| WO | WO 2006/136755 A2 | 12/2006 | | |
| WO | WO 2013/007937 A2 | 1/2013 | | |
| WO | WO 2013/114051 A1 | 8/2013 | | |

* cited by examiner

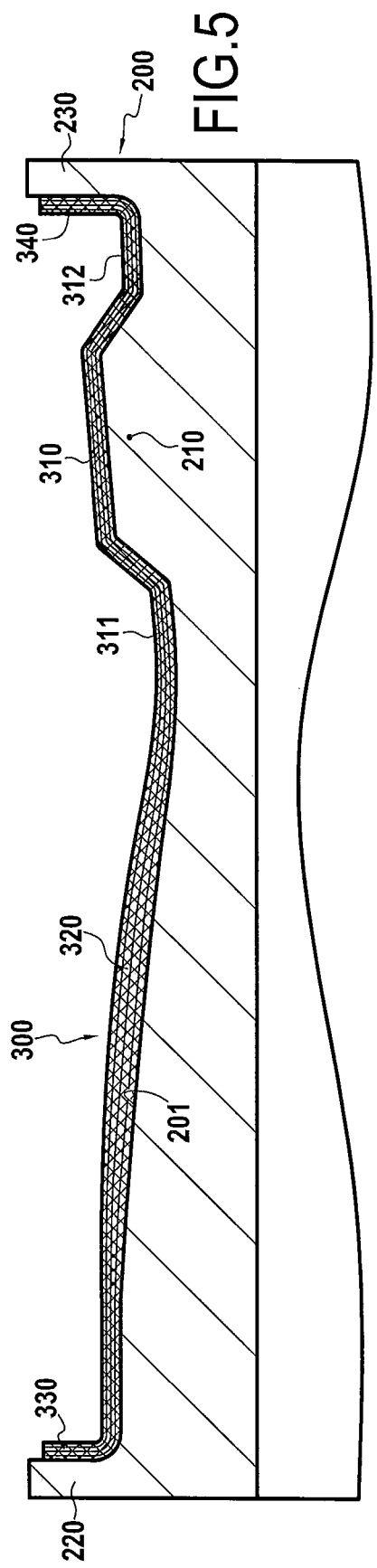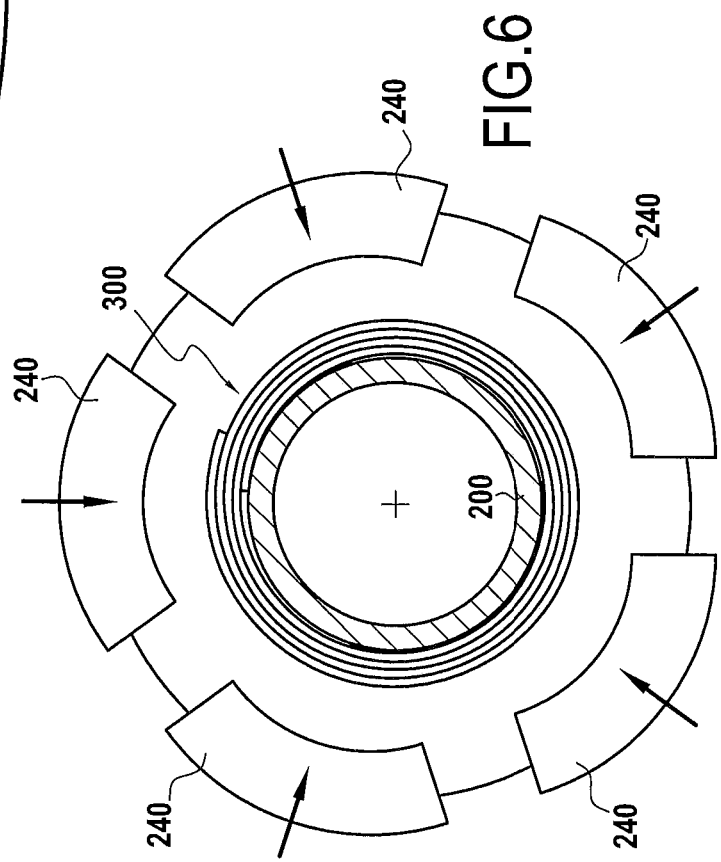

SELF-STIFFENED CASING CONSISTING OF A COMPOSITE MATERIAL WITH AN ORGANIC MATRIX

CROSS REFERENCE TO RELATED APPLICATIONS

This application is the U.S. National Stage of PCT/FR2015/052213 filed Aug. 17, 2015, which in turn claims priority to U.S. Patent Application No. 62/040,680 filed Aug. 22, 2014 and French Application No. 1550278, filed Jan. 14, 2015. The contents of both applications are incorporated herein by reference in their entirety.

BACKGROUND OF THE INVENTION

The invention relates to gas turbine casings, and more particularly, but not exclusively, to gas turbine fan casings for aeroengines.

In a gas turbine aeroengine, the fan casing performs several functions. In particular, it defines the air inlet passage into the engine, it optionally supports abradable material in register with the tips of the blades of the fan, and/or a soundwave absorber structure for acoustic treatment at the inlet of the engine, and it incorporates or supports a retention shield.

Casings, such as a fan casing, used to be made out of metal materials, but they are now made out of composite materials, i.e. from a fiber preform densified by an organic matrix, thus enabling parts to be made of overall weight that is less than the weight of the same parts when made out of metal, while presenting mechanical strength that is at least equivalent, if not better. Fabricating a fan casing out of organic matrix composite material is described in particular in Document U.S. Pat. No. 8,322,971.

Although the use of composite material casings makes it possible to reduce the overall weight of an engine, this reduction in weight lowers the resonant frequencies of the casing, and that can lead to interference with the wakes from the blades of the fan, with the casing then entering into resonance when its own resonant frequencies match an excitation harmonic produced by the wake from the blades. Under such circumstances, it is necessary to stiffen the composite material casing.

OBJECT AND SUMMARY OF THE INVENTION

An object of the invention is to propose a gas turbine casing made of composite material that presents increased stiffness, and to do so without significantly increasing the size and the weight of the casing.

This object is achieved by a gas turbine casing made of composite material comprising reinforcement densified by a matrix, said casing being in the form of a body of revolution and being characterized in that it comprises at least one stiffener portion extending at a radius greater than the radius of upstream and downstream portions of the casing that are adjacent to said stiffener portion so as to form an annular recess in the inside surface of the casing.

By forming at least one step in the profile of the casing that does not follow the profile of the air flow passage normally defined by the entire inside surface of the casing, the casing of the invention presents a particular shape locally that provides self-stiffening. Consequently, the casing of the present invention presents increased stiffness and does so without adding additional elements such as dedicated stiffeners fitted on the composite material casing, which would make fabrication of the casing more complex, and would increase its overall weight.

In an aspect of the casing of the invention, each stiffener portion presents, in axial section, an omega-type shape.

Advantageously, the annular recess formed by each stiffener portion is filled in with a filler material or structure so as to provide continuity of the inside surface of the casing between the upstream and downstream portions of the casing that are adjacent to each stiffener portion.

Also advantageously, the annular recess formed by each stiffener portion is filled in with an acoustic attenuation material or structure.

In another aspect of the casing of the invention, it includes a retention zone presenting thickness that is greater than the remainder of the casing, said stiffener portion(s) being situated outside the retention zone.

The invention also provides a gas turbine aeroengine having a fan retention casing of the invention, and also an aircraft having one or more such aeroengines.

The invention also provides a method of fabricating a gas turbine casing out of composite material, the method comprising weaving a fiber texture in the form of a single-piece strip by three-dimensional or multilayer weaving, shaping said texture by winding it on support tooling, and densifying the fiber reinforcement with a matrix, the method being characterized in that during shaping the fiber texture is shaped so as to obtain a fiber preform having at least one stepped portion extending at a radius that is greater than the radius of upstream and downstream portions of the preform that are adjacent to said stepped portion, said stepped portion forming an annular recess in the inside surface of the casing after densification.

In aspect of the method of the invention, each stiffener portion presents in axial section, an omega-type shape.

Advantageously, the annular recess formed by each stiffener portion is filled in with a filler material or structure so as to provide continuity of the inside surface of the casing between the upstream and downstream portions of the casing that are adjacent to each stiffener portion.

Also advantageously, the annular recess formed by each stiffener portion is filled in with an acoustic attenuation material or structure.

In another aspect of the method of the invention, the fiber preform has a zone of greater thickness than the remainder of the fiber preform that is to form a retention zone in the casing, said stepped portion(s) being situated outside the portion of greater thickness.

BRIEF DESCRIPTION OF THE DRAWINGS

Other characteristics and advantages of the invention appear from the following description of particular embodiments of the invention given as non-limiting examples and with reference to the accompanying drawings, in which:

FIG. 5 is a half-view in axial section of a preform of the FIG. 2 casing obtained by winding the fiber texture as shown in FIG. 4; and FIG. 6 is a section view showing the positioning of injection sectors on the preform of the FIG. 2 casing obtained by winding the fiber texture as shown in FIG. 4.

DETAILED DESCRIPTION OF EMBODIMENTS

The invention applies in general to any gas turbine casing made of organic matrix composite materials.

The invention is described below in the context of its application to a fan casing for a gas turbine aeroengine.

Figure 1:
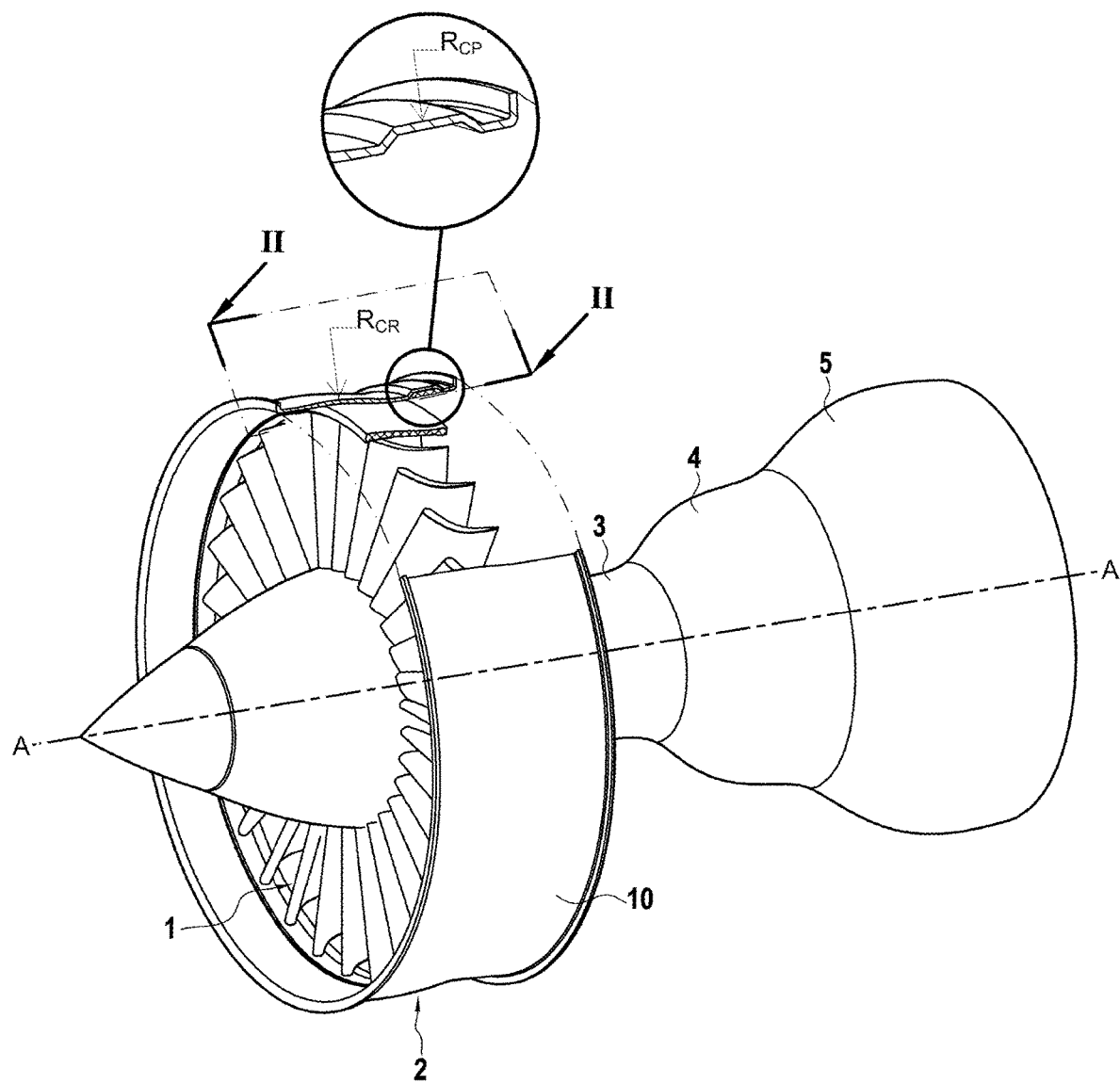
FIG. 1 is a perspective view of an aeroengine in accordance with an embodiment of the invention.

Such an engine, as shown diagrammatically in FIG. 1, comprises, from upstream to downstream in the flow direction of the gas stream: a fan 1 located at the inlet of the engine; a compressor 2; a combustion chamber 3; a high pressure turbine 4; and a low pressure turbine 5.

The engine is housed inside a casing comprising a plurality of portions corresponding to different elements of the engine. Thus, the fan 1 is surrounded by a fan casing 10 in the form of a body of revolution.

Figure 2:
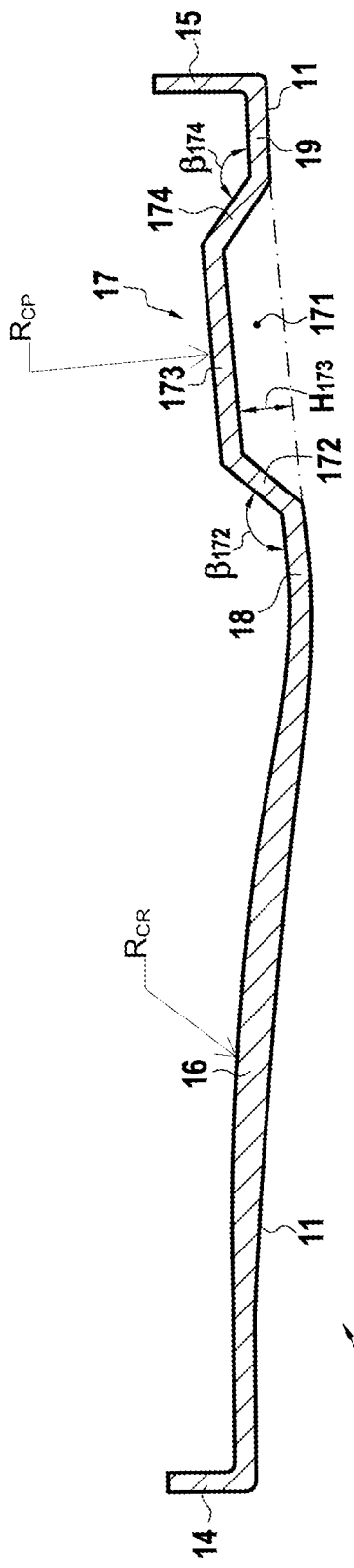
FIG. 2 is a half-view in axial section of the fan casing of the FIG. 1 engine.

FIG. 2 shows the profile (in axial section of axis A—A) of the fan casing 10, which in this example is made out of organic matrix composite material, i.e. from reinforcement made of fibers, e.g. carbon, glass, aramid, or ceramic fibers, and densified by a polymer matrix, e.g. an epoxy, bismaleimide, or polyimide matrix. Fabricating a casing out of composite material is described in particular in Document U.S. Pat. No. 8,322,971. The inside surface 11 of the casing defines the air inlet passage of the engine.

The casing 10 may be provided with external flanges 14, 15 at its upstream and downstream ends in order to enable it to be mounted with and connected to other elements. Between its upstream and downstream ends, the casing 10 presents thickness that varies, a portion 16 of the casing being thicker than the end portions and running into them progressively. The portion 16 extends across the location for the fan, from upstream to downstream so as to form a retention zone capable of retaining debris, particles, or objects ingested at the inlet of the engine, or resulting from damage to the blades of the fan, and projected radially by rotation of the fan, so as to prevent them passing through the casing and damaging other parts of the aircraft.

In accordance with the invention, the casing 10 also has a stiffener portion 17 extending at a radius $R_{CP}$ at a center of an outer surface thereof that is greater than the radius of the upstream and downstream portions 18 and 19 of the casing that are adjacent to the stiffener portion 17, so as to form an annular recess 171 in the inside surface 11 of the casing 10. More precisely, the stiffener portion 17 is formed by an annular plateau 173 that is offset radially towards the outside of the casing relative to the inside surface 11 of the casing. The annular plateau 173 is connected to the upstream and downstream portions 18 and 19 defining parts of the inside surface 11 of the casing via respective annular risers 172 and 174. The angles $._{172}$ and $._{174}$ formed respectively between the risers 172 and 174 and the upstream and downstream portions 18 and 19 are preferably greater than 90° and less than 180°. These angles are defined in particular as a function of the stiffness that it is desired to impart to the casing and as a function of fabrication possibilities.

The height $H_{173}$ of the plateau, corresponding to its radial offset relative to the inside surface 11 of the casing also depends on the stiffness that it is desired to give to the casing, while taking account of constraints on the size of the casing in order to enable it to be integrated in the environment of the engine.

In the presently-described embodiment, the plateau 173 and the risers 172 and 174 present profiles in axial section that are rectilinear. Nevertheless, in variant embodiments, these elements could equally well have profiles that are slightly curved or undulating.

In the presently-described embodiment, the stiffener portion 17 presents an omega-type shape, which is a shape that is well adapted to stiffening.

Figure 3:
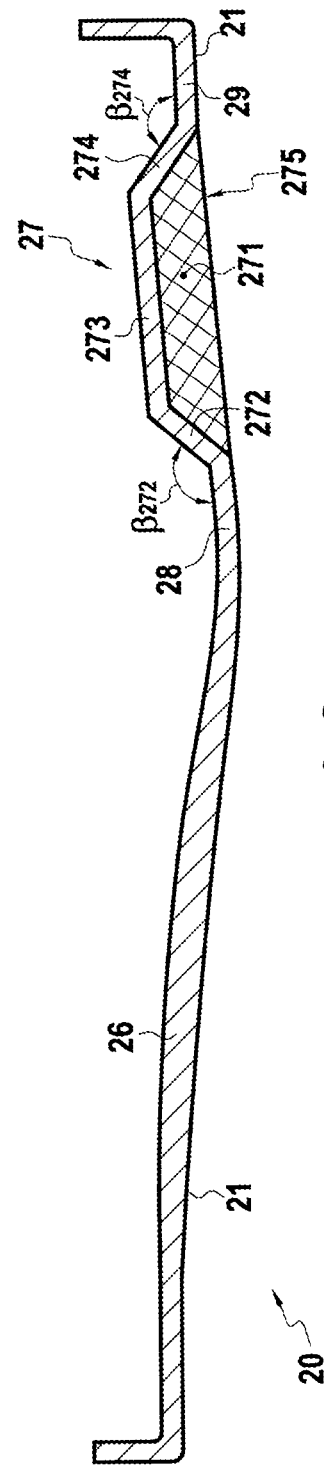
FIG. 3 is a half-view in axial section of a fan casing in accordance with another embodiment of the invention.

FIG. 3 shows a casing 20 in accordance with the invention that differs from the above-described casing 10 in that the annular recess 271 formed by the plateau and the annular risers 273, 273, and 274 defining a stiffener portion 27 is filled with a filler material or structure that corresponds in this example to a cellular structure 275 serving to provide acoustic attenuation.

Filling in the annular recess 271 formed by the stiffener portion 27 serves to provide continuity for the inside surface 21 between the upstream and downstream portions 28 and 29, and consequently to avoid modifying the passage defined by said inside surface of the casing. The filling in may be performed using any appropriate type of material or structure, and in particular a material (e.g. a foam) or a structure (e.g. a cellular structure) that serves to provide acoustic attenuation treatment. In addition to the desired stiffness, the height of the plateau in the stiffener portion may also be defined as a function of the optimum height for acoustic treatment.

The casing of the invention may have a plurality of stiffener portions similar to the above-described stiffener portions 17 and 27. Nevertheless, the stiffener portion(s) is/are preferably situated outside an outer radius $R_{CR}$ at a center of an outer surface of the retention zone formed by the portion of extra thickness corresponding to the respective portions 16 and 26 of the above-described casings 10 and 20.

A method of fabricating the casing 10 out of composite material comprising fiber reinforcement densified by a matrix is described below.

Figure 4:
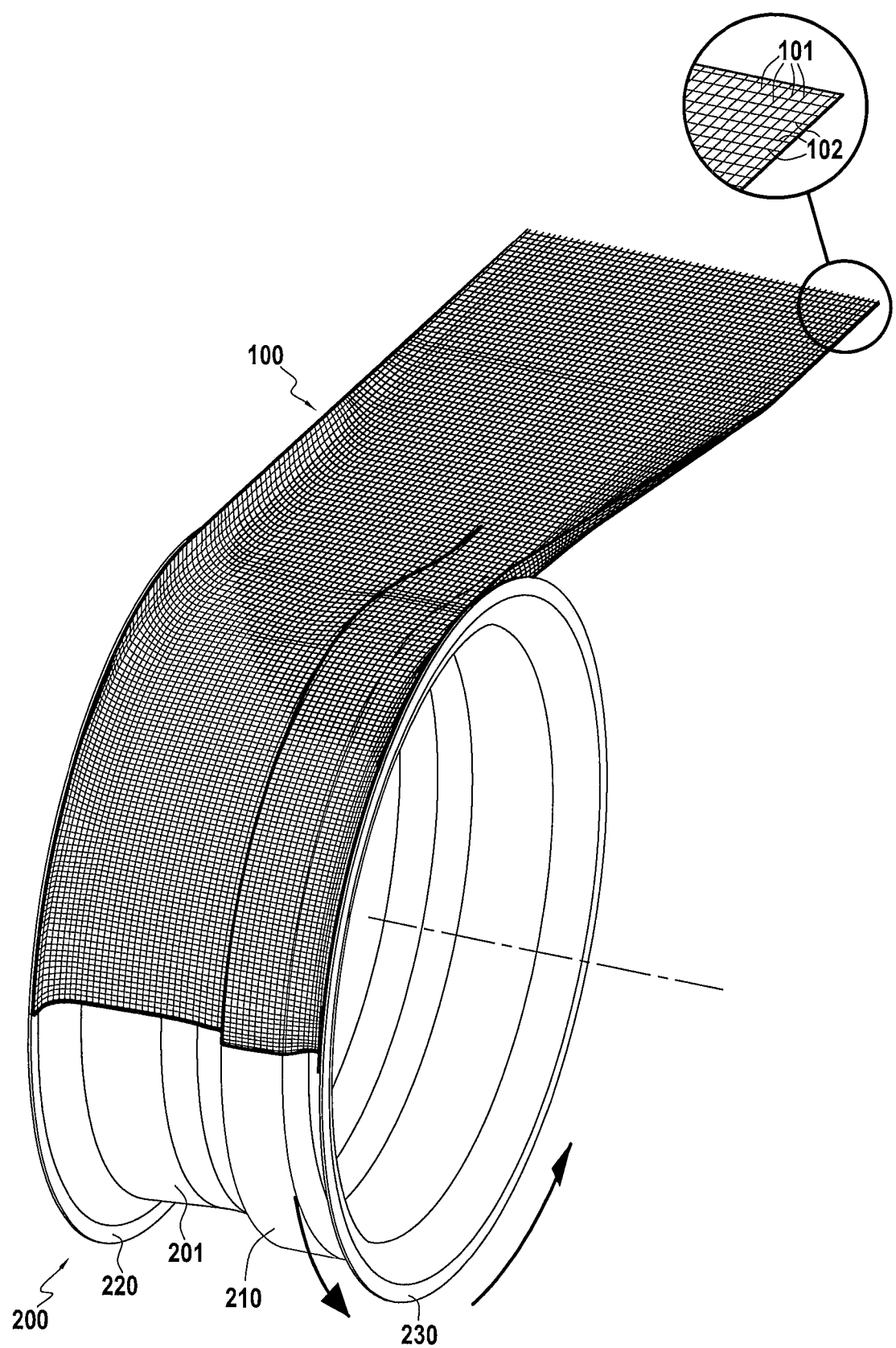
FIG. 4 is a perspective view showing a fiber texture being shaped in order to form the reinforcement of the FIG. 2 fan casing.

The making of the casing begins by forming a fiber texture in the form of a strip. FIG. 4 shows very diagrammatically a fiber structure 100 woven in the form of a strip that is to form a fiber preform for an airplane engine casing.

The fiber structure 100 is obtained by three-dimensional or multilayer weaving that is performed in known manner by using a Jacquard type loom having a bundle of warp yarns 101 or strands arranged thereon in a plurality of layers, the warp yarns being interlinked by weft yarns 102.

In the example shown, the three-dimensional weaving is performed with an interlock weave. The term "interlock weave" is used herein to mean a weave in which each layer of weft yarns interlinks a plurality of layers of warp yarns with all of the yarns in a given weft column having the same movement in the weave plane.

Other known types of multilayer weaving could be used, in particular such as those described in Document WO 2006/136755.

The fiber structure may in particular be woven from yarns made of carbon fibers, of ceramic fibers, such as silicon carbon fibers, of glass fibers, or indeed of aramid fibers.

As shown in FIG. 4, the fiber reinforcement is made by winding the fiber texture 100 made with varying thickness by three-dimensional weaving onto a mandrel 200, which mandrel has a profile corresponding to the profile of the casing that is to be made. Advantageously, the fiber reinforcement constitutes a complete tubular fiber preform for the casing 10, forming a single part including a stiffener corresponding to the stiffener portion 17.

For this purpose, the mandrel 200 presents an outside surface 201 of profile that corresponds to the inside surface of the casing that is to be made. By being wound on the mandrel 200, the fiber texture 100 is fitted closely to its profile. The mandrel 200 includes an annular projection 210 on its outside surface 201, with the shape and the dimensions of the projection corresponding to the shape and the dimensions of the stiffener portion 17 that is to be formed. The mandrel 200 also has two cheek-plates 220 and 230 to form the portions of the fiber preform that correspond to the flanges 14 and 15 of the casing 10.

FIG. 5 is a section view of the fiber preform 300 obtained after winding the fiber texture 100 in a plurality of layers on the mandrel 200. The number of layers or turns is a function of the desired thickness and of the thickness of the fiber texture. This number is preferably at least two. In the presently-described example, the preform 300 has four layers of fiber texture 100.

A fiber preform 300 is obtained with a stepped portion 310 extending at a radius that is greater than the radius of the upstream and downstream portions 311 and 312 of the preform that are situated on either side of the stepped portion. The stepped portion 310 corresponds to the stiffener portion 17 of the casing 10. The fiber preform also has a portion 320 of greater thickness that corresponds to the retention zone portion 16 of the casing, and end portions 330 and 340 corresponding to the flanges 14 and 15 of the casing.

Thereafter, the fiber preform 300 is densified with a matrix.

Densifying the fiber preform consists in filling in the pores of the preform, throughout part or all of its volume, using the material that constitutes the matrix.

The matrix may be obtained in known manner by using a liquid technique.

The liquid technique consists in impregnating the preform with a liquid composition containing an organic precursor of the material of the matrix. The organic precursor is usually in the form of a polymer, such as a resin, possibly diluted in a solvent. The fiber preform is placed in a mold that can be closed in sealed manner and that has a cavity with the shape of the final molded part. As shown in FIG. 6, the fiber preform 300 in this example is placed between a plurality of sectors 240 forming a mold cover and the mandrel 200 forming a support, these elements presenting respectively the outside shape and the inside shape of the casing that is to be made. Thereafter, the liquid precursor of the matrix, e.g. a resin, is injected into all of the cavity so as to impregnate the entire fiber portion of the preform.

The precursor is transformed into an organic matrix, i.e. it is polymerized, by means of heat treatment, generally by heating the mold, after eliminating any solvent and curing the polymer, with the preform continuing to be maintained inside the mold having a shape that corresponds to the shape of the part that is to be made. The organic matrix may be obtained in particular from epoxy resin, such as for example commercially-available high-performance epoxy resin or liquid precursors for carbon or ceramic matrices.

When forming a carbon or ceramic matrix, the heat treatment consists in pyrolyzing the organic precursor in order to transform the organic matrix into a carbon or ceramic matrix depending on the precursor used and on pyrolysis conditions. By way of example, liquid precursors of carbon may be resins having a relatively high coke content, such as phenolic resins, whereas liquid precursors of ceramic, and in particular of SiC, may be resins of the polycarbosilane (PCS) or polytitanocarbosilane (PTCS) or polysilazane (PSZ) type. A plurality of consecutive cycles from impregnation to heat treatment may be performed in order to achieve the desired degree of densification.

In an aspect of the invention, the fiber preform may be densified by the well-known resin transfer molding (RTM) method. In the RTM method, the fiber preform is placed in a mold having the shape of the casing that is to be made. A thermosetting resin is injected into the inside space defined between the rigid material part and the mold and that includes the fiber preform. A pressure gradient is generally set up in this inside space between the location where the resin is injected and resin discharge orifices in order to control and optimize impregnation of the preform by the resin.

By way of example, the resin used may be an epoxy resin. Resins suitable for RTM methods are well known. They preferably present low viscosity in order to facilitate their injection among the fibers. The choice of temperature class and/or chemical nature for the resin is determined as a function of the thermomechanical stresses to which the part is to be subjected. Once the resin has been injected throughout the reinforcement, it is polymerized by heat treatment in compliance with the RTM method.

After injection and polymerization, the part is unmolded. Finally, the part is trimmed to remove excess resin, and chamfers are machined in order to obtain the casing 10 as shown in FIGS. 1 and 2.

The invention claimed is:

1. A gas turbine casing made of composite material comprising reinforcement densified by a matrix, said casing being in the form of a body of revolution and wherein said casing comprises a first external flange at its upstream end and a second external flange at its downstream end, a retention zone provided between the first external flange and the second external flange, an air inlet passage, and at least one stiffener portion made of said composite material, the at least one stiffener portion having an annular plateau having an outer radius at a center of an outer surface thereof extending at a radius greater than an outer radius at a center of an outer surface of the retention zone and a radius of upstream and downstream portions of the casing that are adjacent to said at least one stiffener portion so as to form an annular recess in an inside surface of the casing, the casing comprising the retention zone presenting thickness that is greater than a remainder of the casing, said at least one stiffener portion being situated outside of and downstream from the retention zone and adjacent to the downstream end of the casing, the air inlet passage extending between the first external flange and the at least one stiffener portion, wherein the annular plateau has a rectilinear shape that is offset radially towards an outside of the casing relative to the inside surface of the casing, the annular plateau being connected to the upstream and downstream portions via respective annular risers, wherein an angle is formed between each of the annular risers and the upstream and downstream portions, and wherein each angle is greater than 90 degrees and less than 180 degrees, and wherein an entire inside surface of the retention zone that is made of the composite material defines in part the air inlet passage.

2. The casing according to claim 1, wherein the at least one stiffener portion presents, in axial section, an omega-type shape.

3. The casing according to claim 1, wherein the annular recess formed by the at least one stiffener portion is filled in with a filler material or structure so as to provide continuity of the inside surface of the casing between the upstream and downstream portions of the casing that are adjacent to the at least one stiffener portion.

4. The casing according to claim 1, wherein the annular recess formed by the at least one stiffener portion is filled in with an acoustic attenuation material or structure.

5. The casing according to claim 1, wherein an axial section of the annular plateau and annular risers is rectilinear.

6. A gas turbine aeroengine having a fan retention casing according to claim 1.

7. An aircraft including one or more engines according to claim 6.

8. A method of fabricating a gas turbine casing out of composite material, the method comprising: weaving a fiber texture in the form of a single-piece strip by three-dimensional or multilayer weaving; shaping said fiber texture by winding it on a support tooling to form a fiber reinforcement; and densifying the fiber reinforcement with a matrix to obtain the casing, wherein said casing comprises a first external flange at its upstream end and a second external flange at its downstream end, a retention zone provided between the first external flange and the second external flange, an air inlet passage, and at least one stiffener portion made of said composite material, the at least one stiffener portion having an annular plateau having an outer radius at a center of an outer surface thereof extending at a radius greater than an outer radius at a center of an outer surface of the retention zone and a radius of upstream and downstream portions of the casing that are adjacent to said at least one stiffener portion so as to form, an annular recess in an inside surface of the casing the casing comprising the retention zone presenting thickness that is greater than a remainder of the casing, said at least one stiffener portion being situated outside of and downstream from the retention zone and adjacent to the downstream end of the casing, the air inlet passage extending between the first external flange and the at least one stiffener portion, wherein the annular plateau has a rectilinear shape that is offset radially towards an outside of the casing relative to the inside surface of the casing, the annular plateau being connected to the upstream and downstream portions via respective annular risers, wherein an angle is formed between each of the annular risers and the upstream and downstream portions, and wherein each angle is greater than 90 degrees and less than 180 degrees, and wherein an entire inside surface of the retention zone that is made of the composite material defines in part the air inlet passage.

9. The method according to claim 8, wherein the at least one stiffener portion presents, in axial section, an omega-type shape.

10. The method according to claim 8, wherein the annular recess formed by the at least one stiffener portion is filled in with a filler material or structure so as to provide continuity of the inside surface of the casing between the upstream and downstream portions of the casing that are adjacent to the at least one stiffener portion.

11. The method according to claim 8, wherein the annular recess formed by the at least one stiffener portion is filled in with an acoustic attenuation material or structure.

* * * * *